March 22, 1960 R. M. TAYLOR ET AL 2,929,915
WELDING TRANSFORMER APPARATUS
Filed March 31, 1958 4 Sheets-Sheet 1
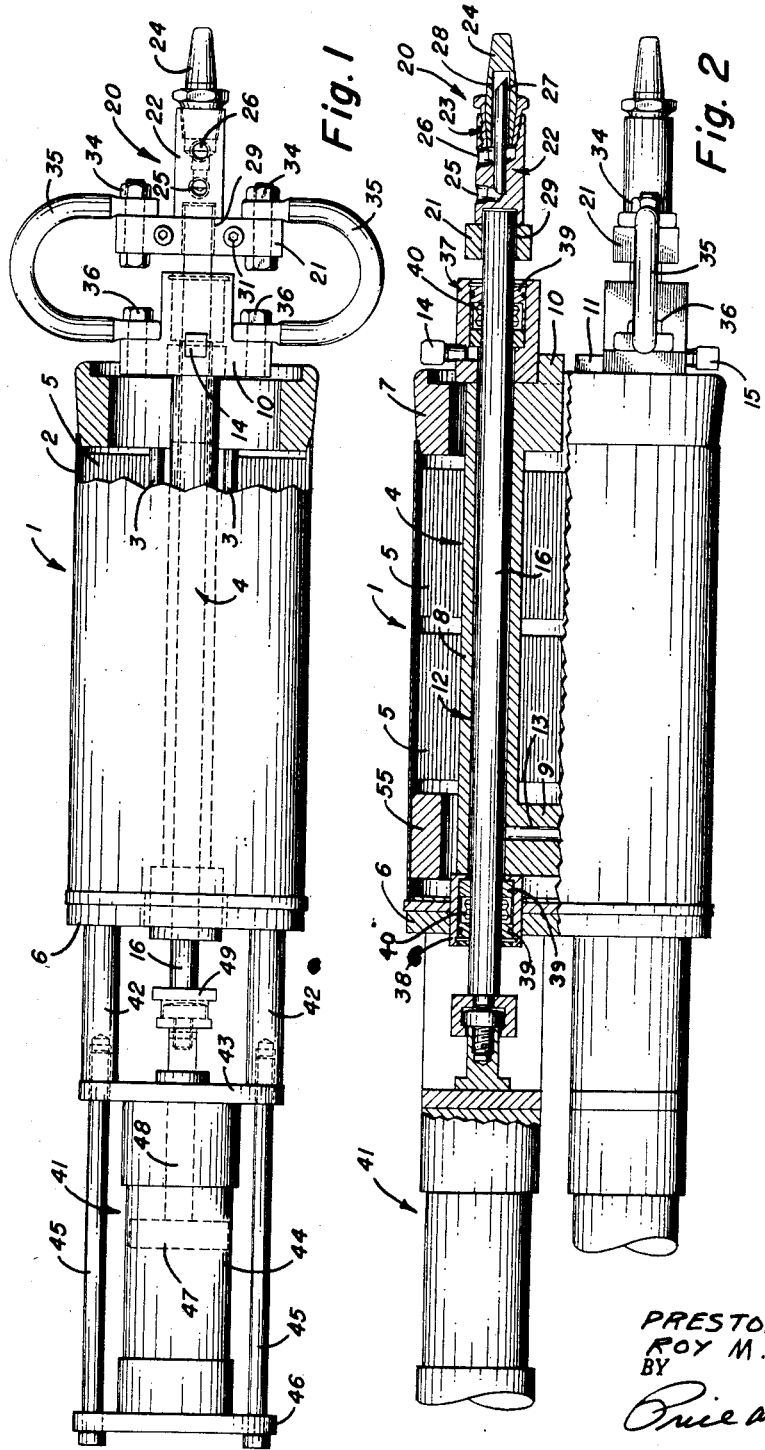
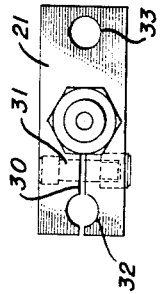
INVENTOR.
PRESTON E. GIRTON
ROY M. TAYLOR
BY
ATTORNEYS

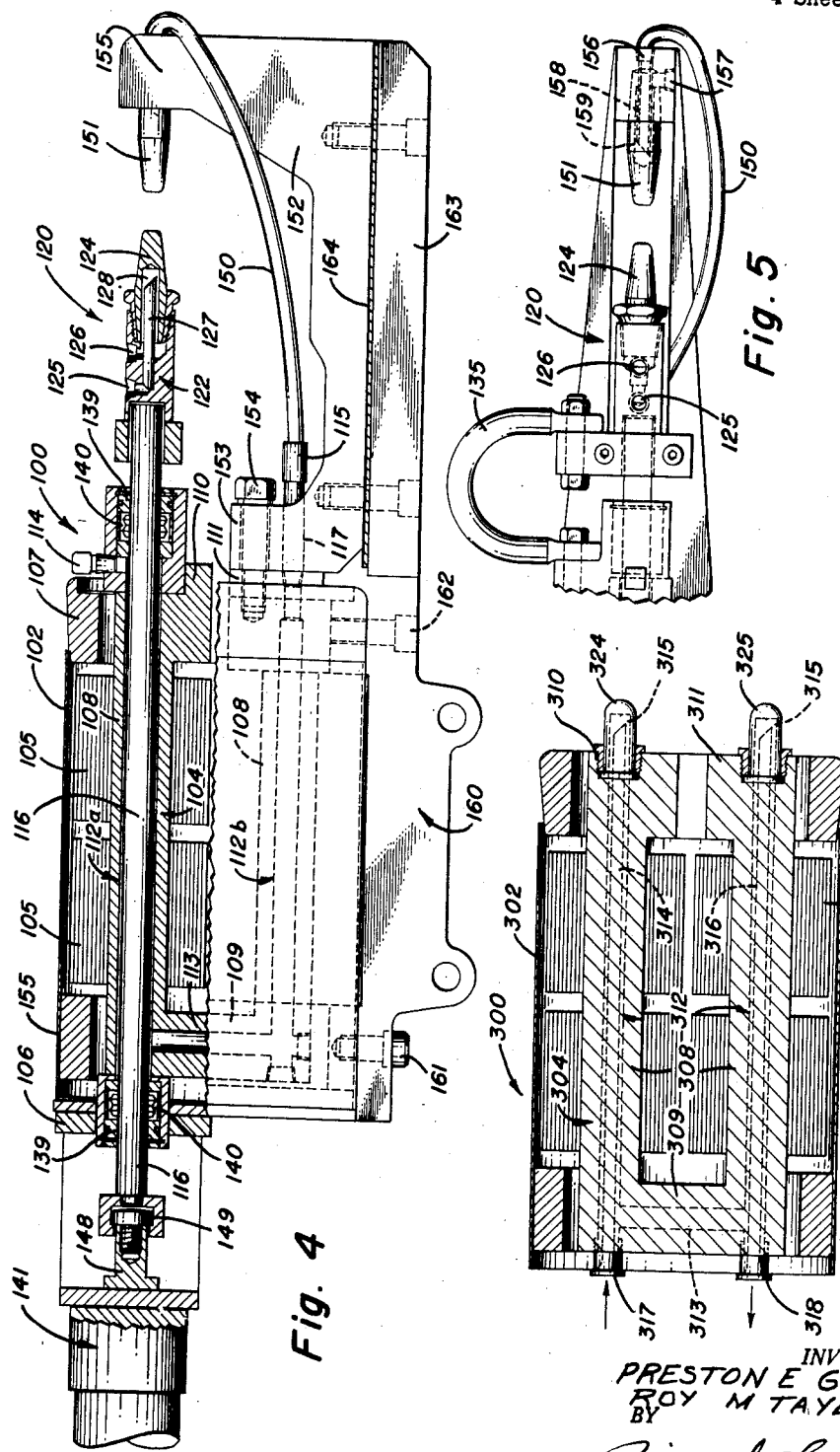

March 22, 1960
R. M. TAYLOR ET AL
2,929,915
WELDING TRANSFORMER APPARATUS
Filed March 31, 1958
4 Sheets-Sheet 3
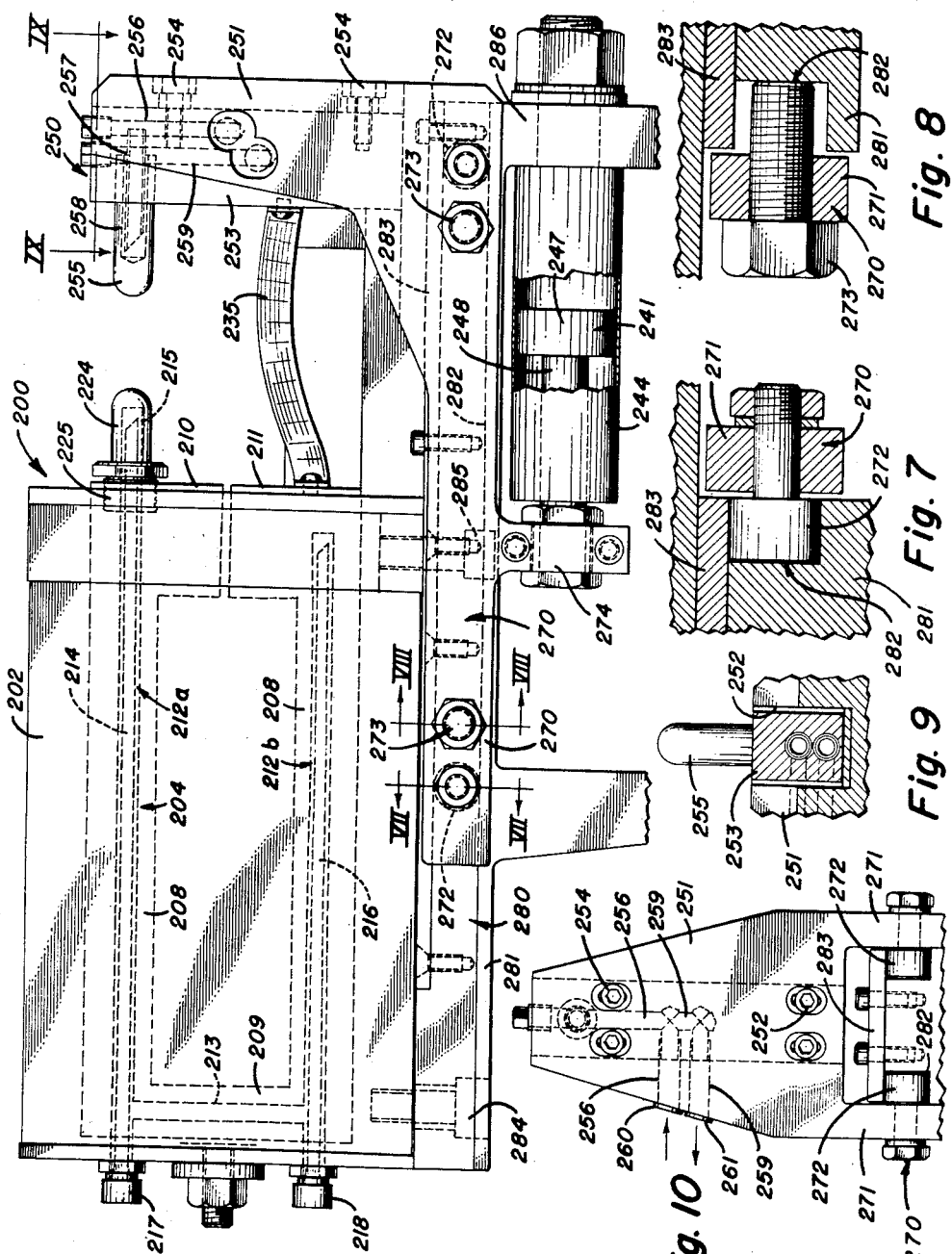
INVENTORS
PRESTON E GIRTON
ROY M TAYLOR
BY
Price and Heneveld
ATTORNEYS

United States Patent Office 2,929,915
Patented Mar. 22, 1960

2,929,915

WELDING TRANSFORMER APPARATUS

Roy M. Taylor, Belmont, and Preston E. Girton, Grand Rapids, Mich., assignors to Kirkhof Manufacturing Corporation, Grand Rapids, Mich., a corporation of Michigan Application March 31, 1958, Serial No. 725,341

6 Claims. (Cl. 219—89)

This invention relates to welding transformer apparatus and more particularly to a novel welding transformer and arrangements of such transformers.

Present day apparatus used in resistance welding includes a transformer connected to a so-called welding gun having the welding tip that contacts the work piece. The transformers are comparatively large units located remotely from the guns. High currents are induced in the transformer and transmitted to the guns by a cable or shunt. The transformers require high primary currents so that the current induced in the secondary and transmitted to the gun is sufficiently high for resistance welding. The currents are so high in these units that the secondary coil requires cooling by water flowing through passages in the coil. The electrode tip also requires cooling to prevent softening and sticking. Needless to say, this equipment requires quite a system of water lines and electrical cables or shunts and is therefore quite complicated and expensive.

The object of this invention is to eliminate the complexity of such systems by reducing the length and quantum of water conduits and electrical cables.

Another object of this invention is to reduce the high primary current requirements of the transformers in such resistance welding apparatus.

Still another object of this invention is to provide a compact welding transformer apparatus.

A further object of this invention is to provide a compact and novel small welding transformer unit.

A further object of this invention is to provide a welding transformer unit having an electrode tip capable of being actuated against the workpiece.

Another object of this invention is to provide a welding transformer which is a complete unit including two electrode tips arranged opposite to each other and having means for actuating one of the tips toward the other for completing a circuit through the tips and the work piece located therebetween.

Still another object of this invention is to provide a novel transformer welding unit having two spaced electrode tips extending in the same direction and having means for simultaneously actuating both of said tips toward a work piece for contacting the work piece to produce two spot welds.

Other objects of this invention will become obvious upon reading the following specification made in conjunction with the accompanying drawings, wherein:

Fig. 1 is a plan view of one of the transformers of this invention.

Fig. 2 is a side elevational view of the transformer of Fig. 1.

Fig. 3 is a front view of the tip structure of the transformer of Figs. 1 and 2.

Fig. 4 is a side elevational, partially sectioned, view of another transformer made in accordance with this invention.

Fig. 5 is a fragmentary plan view showing the construction of the transformer tip of Fig. 4.

Fig. 6 is a side elevational view of still another transformer made in accordance with this invention.

Fig. 7 is a fragmentary, sectional view taken along the plane VII—VII of Fig. 6.

Fig. 8 is a fragmentary, sectional view taken along the plane VIII—VIII of Fig. 6.

Fig. 9 is a sectional view taken along the plane IX—IX of Fig. 6.

Fig. 10 is an end, elevational view of the transformer of Fig. 6.

Fig. 11 is a side elevational, cross sectional view of another transformer made in accordance with this invention.

Figure 12:
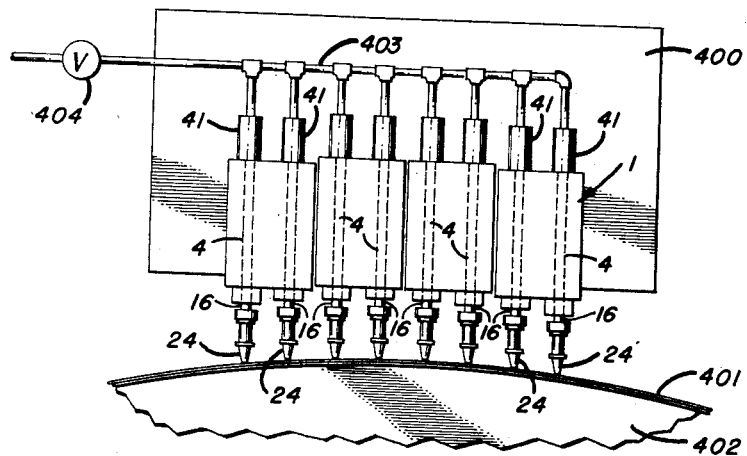
Fig. 12 is a schematic view of an arrangement of transformers of this invention.

Referring to the drawings, particularly Figs. 1 and 2, reference numeral 1 denotes a welding transformer unit including an elongated housing or shell 2 containing primaries or primary coils 3 on each side of a secondary or secondary coil 4. Surrounding the primaries and secondary 3 and 4 are the cores 5 constructed of wrapped laminations of highly conductive material such as iron. The cores 5 provide a path for the flux created by the current in primaries 3 which flux induces the current in the secondary 4. The primaries, secondary and coils are held in housing 2 by the clamp member 55 and covers 6 and 7.

The secondary coil 4 is a U-shaped copper coil laid on its side with its legs 8 extending lengthwise of the housing 1 (Fig. 2). The web or bight portion 9 of the secondary coil is located at the rear end of the housing. At the front end of the housing the secondary pads 10 and 11 are formed integral with the legs 8. These pads constitute two electrodes of the secondary coil. Ordinarily the welding guns are connected to these pads by a long shunt so that the current flows from one pad to the other through the guns for effecting a spot weld.

In this welding transformer, excessive heat is generated by the high currents flowing in the primary coil. To absorb and liberate this heat, the coil is provided with the passageways 12 extending lengthwise of the legs 8 and communicating with the passageway 13 in the web 9 of the coil. Passageways 12 lead to the inlet 14 and outlet 15. The water therefore flows through the inlet 14, passageway 12 in the upper leg 8, passageway 13, passageway 12 in the lower leg (not shown) and out of the outlet 15. This flow can be reversed if desired without any change in result.

In accordance with one aspect of this invention, the legs 8 are made sufficiently wide to provide the passageways 12 which are of sufficient cross section to receive a rod 16. The rod 16 is located in each of the upper and lower passageways 12 of the coil. These rods are centrally located in the passageways 12 permitting the water to pass around the rod and also permitting the rod to be reciprocated in the passageway. The rod is supported by the assemblies 37 and 38 at each end as will be described in more detail hereinafter.

The welding tip assembly 20 is secured at the front end of the rod 16. This assembly includes the jumper or shunt arm 21 having a circular tip support bar 22 protruding forwardly thereof. The bar 22 has an opening 23 (Fig. 2) in its forward end receiving the welding tip 24.

Each welding tip assembly 20 has its own cooling system which includes the inlet port 25, outlet port 26 and the deflection tube 27. The deflection tube 27 is a hollow tube communicating with the inlet port 25 and the blind opening 28 in the tip 24, the opening 28 being of greater diameter than the outer diameter of the deflection tube permitting water to pass around the tube. The outlet port 26 also communicates with the blind opening 28. As a result of this construction, water is permitted to pass through the deflection tube from inlet 25 in the blind opening 28 and then around tube 27 out of the outlet port 26.

Each tip assembly 20 is secured to the end of the rod 16 by a construction best illustrated by Figs. 1 and 3. Each bar 21 has a central opening 29 receiving a rod 16. The split 30 extends from the opening 29 through one side of the arm 21. This permits the two sections formed by the split to be clamped or forced together by a bolt and nut assembly 31.

The shunt or jumper arm 21 also has the openings 32 and 33 for receiving the bolt and nut assemblies 34 which secure one end of the jumper or shunts 35. The other ends of the jumpers 35 are secured to the secondary pad 10 by the bolts 36. Thus the tips are each electrically connected to one of the electrode terminals of the secondary coil.

At the forward and rearward ends of each leg 12 of the coil 4 is located the assemblies 37 and 38. These assemblies are identical and include the bearings 39 and the sealing elements 40. The bearings 39 support the rods 16 in the central portion of the passageway 12 permitting reciprocation of the rod in the passageway. The sealing elements 40 prevent the water from escaping at the front or rear of the secondary coil.

Actuating means for rods 16 are located at their rearward ends. Separate actuating means is provided for each of the rods although these means, as will be explained hereinafter, are coordinated so that the force applied to each of the rods is uniform. The actuating means comprises a fluid motor 41 mounted on a support attached to the cover 6. This entire structure includes the pillars 42 extending from the cover 6 and spacedly mounting a plate 43 from the cover or rear end of the transformer. Mounted on the plate 43 and supported by tie rods 45 and clamp plate 46 is the cylinder 44 containing a piston 47 connected to the piston rod 48. The piston rod 48 is connected to the rod 16 by a universal coupling 49 which allows a certain amount of misalignment of piston rod 48 and rod 16 without creating a bind. The rod 16 is thus actuated by exerting a fluid pressure on the back of the piston 47.

Fig. 4 discloses a modification of the welding transformer of Figs. 1 and 2. The upper portion of this transformer unit 100 is identical to the upper portion of the welding transformer of Figs. 1 and 2. It includes the housing 102 containing primary coils (not shown) on each side of a secondary coil 104. Surrounding the coils are cores 105. The coils and cores are held in the housing 102 by a clamp member 155 and covers 106 and 107. The secondary coil 104 is shaped identically to the coil previously described. The basic difference is the water passageway 112b in the lower leg 108. The cross sectional area of this passageway is reduced because it does not receive a rod as previously described. The upper passageway 112a does receive the rod 116 which extends forwardly and rearwardly of the transformer unit. The two passageways are connected by the passageway 113 in the web or bight portion 109 of the secondary coil. In this modification, the passageway 112b communicates with a tube 150 leading to a tip assembly which will be described hereinafter. Passageway 112a communicates with the inlet 114.

Rather than having two tips extending directly from the transformer housing, in this modification we provide a tip 151 aligned with and located opposite the tip 124. The tip 151 is located in a position where the tip 124 will substantially contact it when actuated by the piston rod 148 of the fluid motor 141.

The transformer housing 102 is mounted on a frame member 160 by the bolts 161 and 162. The frame member 160 has a portion 163 extending forwardly beyond the forwardmost position of the tip 124. This forward portion 163 supports a casting 152 on which the tip 151 is mounted. A laminated phenolic insulation pad 164 electrically isolates the casting 152 from the frame 160.

The casting 152 is substantially U-shaped. It has a relatively short leg 153 located adjacent the transformer housing and connected to and contacting the secondary pad 111. It is secured to the pad by a bolt 154. The other leg 155 located forwardly of the tip 124 is substantially longer for supporting the tip 151 in alignment with the tip 124.

A cooling system for the tip 151 (Fig. 5) includes the inlet 156, the outlet 157, and the deflection tube 158 extending into the blind opening 159 in the back end of the tip. Water is thus permitted to enter the port 156, flow through the deflection tube 158, into the opening 159 and around the deflection tube and out of the port 157. This flow may be reversed. For the convenience of eliminating the number and length of hoses required, a hose 150 connects the fitting 115, which communicates with the passageway 112b by means of a passageway 117, with the port 156. As a result, the cooling system for the secondary coil and tip are connected resulting in water flowing into inlet 114 and out of port 157.

The tip assembly 120 has an identical cooling mechanism previously described in relation to Figs. 1, 2 and 3. This structure includes the opening 128 in bar 122 receiving the deflection tube 127. The water passes into port 125 through and around tube 127 and out of port 126.

It should be obvious from the above description that the tip 151 is stationary while the tip 124 is movable toward and away from the tip 151. This permits a work piece to be spot welded by placing it between the two tips and then actuating tip 124 completing the electrical path between the pads 110 and 111 of the secondary coil. It should also be understood the components of the units shown in Fig. 4 including the tip assembly 120, jumper 135, seal 140, bearing 139, and other various components are provided for the same purposes as that of similar components described in relation to Figs. 1, 2 and 3. Therefore, reiteration of the description and operation of these components is not considered necessary.

Figs. 6, 7 and 8 show another form of this invention. In this modification the primary (not shown) is divided into two sections, one located on each side of the secondary loop 204 in the same manner as shown and described in relation to Fig. 1. Cores (not shown) surround the primary and secondary. The secondary loop 204, shown in broken lines, is a U-shaped member laid on its side and having its two legs 208 extending lengthwise of the housing 202. The bight or web portion 209 is located in the rear portion of the housing. The ends of the legs 208 terminate in secondary electrode pads 210 and 211 which are separated one from the other. The legs have the passageways 212a and 212b communicating with a passageway 213 in the bight portion 209. Deflector tube 214 extends through passageway 212a and into a bore 215 in the tip 224. Deflector tube 216 extends into the passageway 212b. Deflector tubes 214 and 216 are connected to fittings 217 and 218 which serve as inlet and outlet ports. The path of the water passing through the secondary coil is into fitting 217, through deflector tube 214, passageways 212a, 213, 212b, deflector tube 216 and out of fitting 218, or vice versa.

A welding tip 224 is rigidly secured by threaded adapter 225 to the pad 210. A jumper or shunt 235 electrically connects the pad 211 to the tip assembly 250. The tip assembly 250 includes an electrode housing 251 having a recess or groove 252 (Fig. 9) in which is mounted a tip support bar 253 constructed of a highly conductive material such as copper. The bar is adjustably secured in the groove 252 by the bolts 254. The bar 253 supports a tip 255.

The tip assembly has a water cooling system including the passageway 256 extending first laterally through the electrode block and into the copper bar (Fig. 9) and then upwardly to a deflection tube 257 (Fig. 6). The deflection tube extends into a blind opening 258 in the tip 255. The blind opening 258 being slightly larger in diameter permitting water to pass around the tube. A second passageway 259 communicating with opening 258 extends downwardly in the copper bar (Fig. 6) and then laterally through the electrode block (Fig. 9). This system has fittings 260 and 261 for the inlet and outlet.

In this modification of Figs. 6-10 the jumper 235 is secured to the bar 253 providing an electrical path for the current from the pad 211. The electrode tip 255 is movable toward the tip 224, the two tips being aligned for engagement. Thus contact of the two tips closes a path for the flow of current to effect the spot weld.

The construction for effecting this movement of tip 255 includes a carriage 270 integral with the electrode block 251. The carriage 270 rides on a frame 280 to which the transformer is secured by the bolts 284 and 285. The carriage 270 is slidable on the frame 280 in a direction effecting movement of tip 255 toward and away from the tip 224.

The frame 280 is a thick plate 281 having grooves 282 on each side thereof (Figs. 7 and 8). A retainer plate 283 is secured above the plate 281 and extends over the groove 282 providing tracks for the carriage rollers 272. A track is located on each side of the frame running longitudinally of the transformer. The carriage comprises two side runners 271 depending from the electrode block (Fig. 10) and extending rearwardly toward the transformer on each side of the plate 281. The rollers 272 are rotatably secured on each of the runners 271 and extend into and ride in the groove 282 (Fig. 7). A pair of guide pins or screws 273 also protrude inwardly from the runners 271 into the grooves 282. These pins guide the carriage and prevent the rollers from binding in the grooves or tracks 282. This structure permits the carriage to be moved longitudinally of the transformer thus permitting the welding tip 255 to be moved toward and away from the tip 224.

The carriage 270 is actuated by a fluid motor 241 which includes the cylinder 244, the piston 247 and piston rod 248. The cylinder 244 is secured to an arm 286 depending from and integral with the frame 280 and located forwardly of the transformer. This arm is stationary and maintains the cylinder stationary at all times. The piston rod 248 is secured to a depending arm 274 which is integral with the runners 271 of the carriage. By means of this structure the carriage is actuated when fluid pressure is applied to the piston, the direction depending on which side of piston 247 fluid pressure is exerted.

Fig. 11 shows another transformer having its tips extending directly from the secondary coil. The tip construction of this transformer is very similar to the tip construction described and illustrated by Figs. 6-10. The transformer 300 includes a housing 302 containing a primary (not shown) located on each side of the secondary coil 304. Cores 305 surround the coils providing the flux path. The secondary coil 304 is a U-shaped member laid on its side and extending longitudinally of the housing 302. Its two legs 308 have the passages 312 communicating with the passageway 313 in the bight portion. Extending centrally of passageways 312 are deflector tubes 314 and 316 which also extend into the bores 315 of the tips 324. Deflector tubes 314 and 316 are connected to fittings 317 and 318. The flow of water with this arrangement is into fitting 317, through deflector tube 314, passageways 312 and 313, and deflector tube 316, out of fitting 318, or vice versa.

In this modification, both of the tips 324 and 325 are secured directly to the pads 310 and 311, respectively.

This construction has the same advantage as the previous constructions, of eliminating the high current and voltage loss from the long shunts presently used in this type of apparatus. The elimination of these shunts permits the units to be made smaller so that they can be placed one beside the other and brought to the work piece rather than being mounted at a remote location and electrically connected to guns. This eliminates the high primary current requirement and makes for a more compact welding apparatus.

*Operation*

Figure 13:
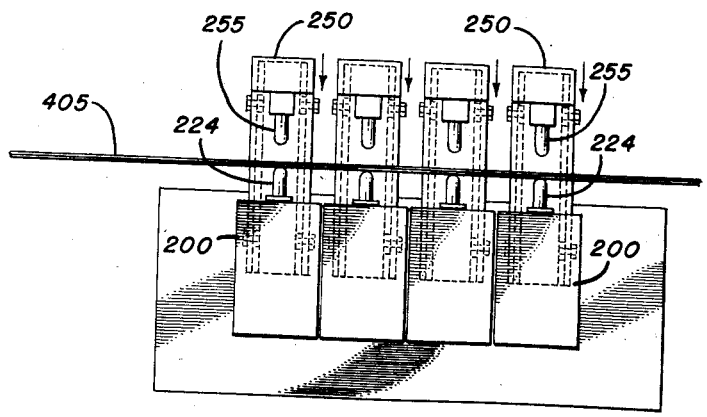
Fig. 13 is a schematic of another arrangement of transformers of this invention.
Figure 14:
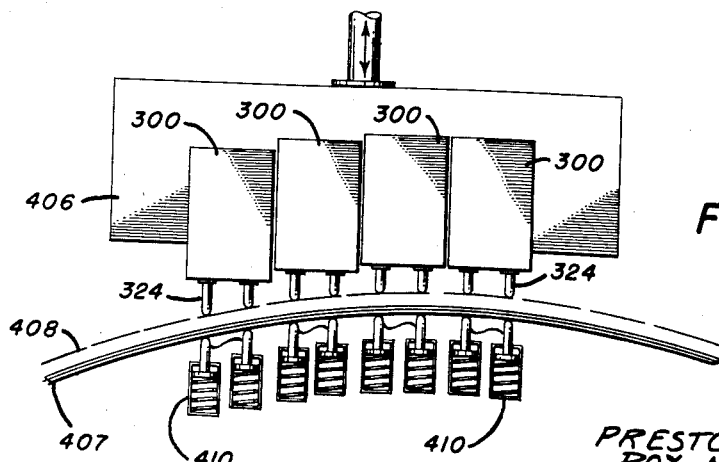
Fig. 14 is a schematic of still another arrangement of transformers of this invention.

The operation of the various forms of the transforming units described above will be illustrated and described by various arrangements of the transformers as shown in Figs. 12, 13 and 14. These arrangements themselves are considered to be novel and of patentable significance.

A schematic arrangement of the welding transformers described above and illustrated by Figs. 1, 2 and 3 is shown in Fig. 12. As stated above, the elimination of the long shunt and the welding guns permits a decrease in the size of the entire welding transformer. As a result, the transformer units can be compactly located one beside the other and mounted close to the work piece eliminating long and complicated water hose systems and also the long and complicated shunt systems. As illustrated by Fig. 12, the transformer units 1 are arranged directly next to each other. The units are held stationary on the support member 400. The tips 24 extend toward the work piece illustrated by the sheets 401 supported on a support surface 402. In non-welding position, the tips 24 are spaced equal distance from the work piece 401. The cylinder and piston assemblies 41 are located at the end of the transformer opposite the tips 24. These assemblies are all connected to a common hydraulic fluid line 403 which is controlled by a valve 404. This valve is actuated by any number of means such as a solenoid or hand.

In operating this apparatus, the valve 404 is actuated causing the assemblies 41 to be subjected to hydraulic fluid in the lines 403. This immediately actuates the pistons 48 (Fig. 1, not shown in Fig. 12) causing the rods 16 to be actuated forwardly moving the tips 24 against the work piece 401. When the tips 24 contact the work piece, a path for the current induced in the secondary coil is created. This path is preferably through the support member 402 which is constructed of a highly conductive material. In some cases, the lower work piece, if of greater gage, can be made to carry the current. One advantage of having the work piece carry the current is that the spot weld mark tends to be made only on one side of the work piece. The reason for this is that the current flows through the lower work piece from one tip to the other. If the work piece holder 402 is more conductive than the work piece itself, the current flows through the work piece and then through the holder to the adjacent tip. This gives a spot weld mark on each side of the workpiece.

It should be obvious that with this apparatus the actuation of the tips is very simple. The force exerted on the tips is uniform because of a uniform fluid force on each of the pistons actuating the tips. Uniformly spaced weld spots are produced by proper spacing of the two tips of each transformer and the spacing of the transformers themselves. We prefer that the transformers can be arranged side by side with all the tips spaced at equal intervals while still permitting a wide range of spacings by changing the relative positions of the transformers.

Fig. 13 shows an arrangement for which the transformers of either Figs. 4 and 5 or Figs. 6-10 are adapted. For the sake of simplicity and in order to explain the operation of all the embodiments, but since the actuation of the tip of Figs. 4 and 5 is like that of Figs. 1-3, which has already been described, we have shown only the transformer of Figs. 6–10 in Fig. 13. In this figure the transformer units 200 are located side by side in the same manner as Fig. 12. This aligns each of the tips 224 along a given line and the tips 225 opposite tips 224 along a line parallel to said given line. The two tips, 224 and 225 are each spaced one from the other for receiving a work piece 405 between them. When the work piece is inserted between the tips the fluid motors 241 are actuated by subjecting them to hydraulic fluid from a common fluid line. This pushes the piston rod 248 to the left shown in Fig. 6 (downwardly in Fig. 13) causing the carriage 270 riding in the groove 282 on the roller 272 to ride along the frame 280 carrying the electrode block 251 along with it toward the tip 224. This moves the tip 255 substantially to the tip 224 pinching the work piece 405 between the two tips. As this occurs, a current path is created through the work piece and the current induced in the secondary coil flowing through this path produces a spot weld at the points of contact between the tips and the work piece.

This apparatus has many of the same advantages of the apparatus of Fig. 12. A uniform pressure is applied to the tips thus coordinating their operation. The primary current requirement is considerably lower as compared to present day apparatus because of the eliminaiton of the guns and shunts. The entire apparatus is less-complicated by elimination of water hoses, shunts and guns.

Fig. 14 shows an arrangement of the transformer described above and illustrated by Fig. 11. This is the simplest form in which the tips protrude directly from the secondary coil eliminating the long shunts and thus the high primary current requirement. In this arrangement, the transformers 300 are mounted on a common support member 406 which is adapted to be moved and actuated in directions toward and away from a work piece 407. The transformers are arranged in a position so that the end of the tips lie on the line 408 which is parallel to the work piece 407. In some instance, as is illustrated, the tips are slightly longer or shorter so that the very ends lie on the lines 408. Although we show the tips 324 and 325 all parallel to one another, it should be understood that the units can be tipped slightly in order that the tips are all perpendicular to the work piece. This arrangement will prevent skidding of the tips on the work piece and the resultant expulsion of metal caused by such skidding. The work piece is supported on a plurality of pairs of spring biased contacts, 410. The contacts of each pair are electrically connected together providing a path for the current flow.

This apparatus of Fig. 14 is operated by actuating a mechanism which causes the support member 406 to move downwardly to a position where the tips 324 and 325 contact the work piece 407. When the tips engage the work piece, a path for the current induced in the secondary coil is created through the work piece and the contacts 410. The spring biased contacts 410 provide for a uniform pressure on the tips.

This arrangement has many of the advantages of the equipment of Fig. 12. The long shunts and electrode guns are eliminated providing a more compact apparatus that is less complicated. The spacings of the transformer and the tips are such that a uniform spot center is produced, that is at spaced intervals along the work piece 407. Elimination of shunts and guns considerably reduces the primary current requirement making the apparatus more versatile.

Having described our invention, it should become obvious that although we have described preferred forms, other alterations and modifications thereof are possible within the broadest aspect of this invention. Therefore, this invention should be limited only as set forth in the appended claims.

We claim:

1. In a welding transformer having a primary coil stacked adjacent a water cooled secondary loop having a water passageway, a core providing the flux path, the improvement comprising: a rod reciprocally mounted on said loop with at least a portion thereof extending into said passageway; an electrode tip mounted on said rod and electrically connected to one of the terminals of said secondary loop.

2. In a compact welding transformer having a primary coil and a secondary loop arranged side by side in a housing, and having a core providing a flux path; said secondary loop including a substantially U-shaped conduit having its legs extending longitudinally of said housing; said conduit having a water passageway for cooling said loop; a rod reciprocally mounted in the passageway of at least one of said legs and extending outwardly from said housing; an electrode tip mounted on said rod and electrically connected to one of the terminals of said secondary loop.

3. In a compact welding transformer having a primary coil and a secondary loop arranged side by side in a housing and having a core providing a flux path; said secondary loop including a substantially U-shaped conduit having its legs extending longitudinally of said housing; said conduit having a water passageway for cooling said loop; a rod extending through at least one passageway the entire length of one leg and extending outwardly from both ends; an electrode tip on one end of said rod; motive power means on the other end of said rod; said electrode tip being electrically connected to one terminal of said secondary loop.

4. In a compact welding transformer having a primary coil and a secondary loop arranged side by side in a housing and having core means providing a flux path; said secondary loop including a substantially U-shaped conduit having its legs extending longitudinally of said housing; said conduit having a water passageway for cooling said loop; rods extending through the passageways the entire length of the legs and extending outwardly from both ends; electrode tips on one end of each rod; motive power means on the other ends of said rods; said electrode tips each being electrically connected to different terminals of said secondary loop.

5. In a compact welding transformer having a primary coil and a secondary loop arranged side by side in a housing, and having a core providing a flux path; said secondary loop including a substantially U-shaped conduit having its legs extending longitudinally of said housing; said conduit having a water passageway for cooling said loop; a rod mounted in the passageway of one of said legs and extending outwardly from said housing; an electrode tip mounted on said rod and electrically connected to one of the terminals of said secondary loop; a second electrode tip mounted opposite and in alignment with said first mentioned electrode tip and electrically connected to the other of the terminals of said secondary loop; and motive means for moving one of said electrode tips toward the other; said second electrode tip being spaced a distance from said first mentioned electrode tip to receive a workpiece therebetween and permitting said motive power means upon being actuated to cause both of said tips to contact the workpiece.

6. In a compact welding transformer having a primary coil and a secondary loop arranged side by side in a housing and having a core providing a flux path; said secondary loop including a substantially U-shaped conduit having its legs extending longitudinally of said housing; said conduit having a water passageway for cooling said loop; a rod extending through one passageway the entire length of one leg and extending outwardly from both ends; an electrode tip on one end of said rod; motive power means on the other end of said rod; said electrode tip being electrically connected to one terminal of said secondary loop; a second electrode tip mounted opposite and in alignment with said first mentioned electrode tip and electrically connected to the other of the terminals of said secondary loop; said second electrode tip being spaced a distance from said first mentioned electrode tip to receive a workpiece therebetween and permitting said motive power means upon being actuated to cause both of said tips to contact the workpiece.

References Cited in the file of this patent

UNITED STATES PATENTS

| | | |
|---|---|---|
| 1,236,090 | Kicklighter | Aug. 7, 1917 |
| 1,779,365 | Von Henke | Oct. 21, 1930 |
| 1,993,961 | Groven et al. | Mar. 12, 1935 |
| 2,242,867 | Martin | May 20, 1941 |
| 2,295,925 | Biederman et al. | Sept. 15, 1942 |
| 2,300,700 | Porter | Mar. 3, 1942 |
| 2,318,023 | Strickland et al. | May 4, 1943 |
| 2,318,024 | Strickland | May 4, 1943 |
| 2,443,077 | Martin | June 8, 1948 |